(12) United States Patent
Chalfant et al.

(10) Patent No.: US 10,942,749 B2
(45) Date of Patent: Mar. 9, 2021

(54) PROCESSOR MEMORY MAPPED BOOT SYSTEM

(71) Applicant: Dell Products L.P., Round Rock, TX (US)

(72) Inventors: David Keith Chalfant, Round Rock, TX (US); Swamy Kadaba Chaluvaiah, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 139 days.

(21) Appl. No.: 15/971,906

(22) Filed: May 4, 2018

(65) Prior Publication Data

US 2019/0339984 A1 Nov. 7, 2019

(51) Int. Cl.
*G06F 9/4401* (2018.01)
*G06F 3/06* (2006.01)
*G06F 12/02* (2006.01)
*G06F 12/06* (2006.01)

(52) U.S. Cl.
CPC .......... *G06F 9/4401* (2013.01); *G06F 3/0629* (2013.01); *G06F 12/0284* (2013.01); *G06F 12/0646* (2013.01)

(58) Field of Classification Search
CPC .................................................. G06F 9/4401
See application file for complete search history.

(56) References Cited

U.S. PATENT DOCUMENTS

| 2003/0233533 | A1* | 12/2003 | Avraham | G06F 9/4406 713/1 |
| 2004/0250057 | A1* | 12/2004 | Fujita | G06F 9/4406 713/1 |
| 2019/0012088 | A1 | 1/2019 | Chaluvaiah et al. | |

* cited by examiner

*Primary Examiner* — Kim Huynh
*Assistant Examiner* — Eric Chang
(74) *Attorney, Agent, or Firm* — Haynes and Boone, LLP

(57) ABSTRACT

A processor memory mapped boot system includes a processing system having a processor memory subsystem, and a memory system having at least one memory device. A Basic Input/Output System (BIOS) engine is coupled to the processing system and the memory system, and is configured to begin boot operations and detect a boot memory mode setting for the processor memory subsystem. The BIOS engine configures a memory space that includes the at least one memory device and the processor memory subsystem. In response to detecting the boot memory mode setting, the BIOS engine will configured the processor memory subsystem to provide a first memory region of the memory space. The BIOS engine will then complete boot operations utilizing the processor memory subsystem providing the first memory region of the memory space.

15 Claims, 5 Drawing Sheets

PROCESSOR MEMORY MAPPED BOOT SYSTEM

BACKGROUND

The present disclosure relates generally to information handling systems, and more particularly to mapping processor memory for use in booting an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems such as, for example, server devices, desktop computing devices, laptop/notebook computing devices, and/or other computing devices known in the art, are now being provided with processors (e.g., second generation Xeon Phi processors provided by INTEL® corporation of Santa Clara, Calif., United States) that include on-package, relatively high-bandwidth Multi-Channel Dynamic Random Access Memory (MC-DRAM) that was designed for use with highly parallel performance seeking applications executed on the computing device. Conventionally, the MC-DRAM is not utilized in the computing device until an application requests its utilization after the computing device has completed a boot process to enter a runtime environment and an operation system is running on the computing device. That boot process is typically performed by a Basic Input/Output System (BIOS) in the computing device, and the MC-DRAM cannot be utilized by the BIOS in the pre-boot environment for booting operations because conventional Memory Reference Code (MRC) in the BIOS that is responsible for configuring the MC-DRAM will always map the MC-DRAM outside of the conventional default memory space region (e.g., the "low memory address space" between the 0-4 GB memory region of the memory space for the computing device) that is utilized by the BIOS for BIOS boot code execution.

Accordingly, it would be desirable to provide a boot system that utilizes available processor memory for booting operations in order to reduce computing device boot time.

SUMMARY

According to one embodiment, an information handling system includes a Basic Input/Output System (BIOS) processing system; and a BIOS memory system that is coupled to the BIOS processing system and that includes instructions that, when executed by the BIOS processing system, cause the BIOS processing system to provide a BIOS engine that is configured to: begin boot operations; detect a boot memory mode setting for a processor memory subsystem that is part of a primary processing system; configure a memory space that includes the processor memory subsystem and at least one memory device that is included in a primary memory system, wherein the configuring the memory space includes mapping, in response to detecting the boot memory mode setting, the processor memory subsystem to provide a first memory region of the memory space; and complete boot operations utilizing the processor memory subsystem providing the first memory region of the memory space.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
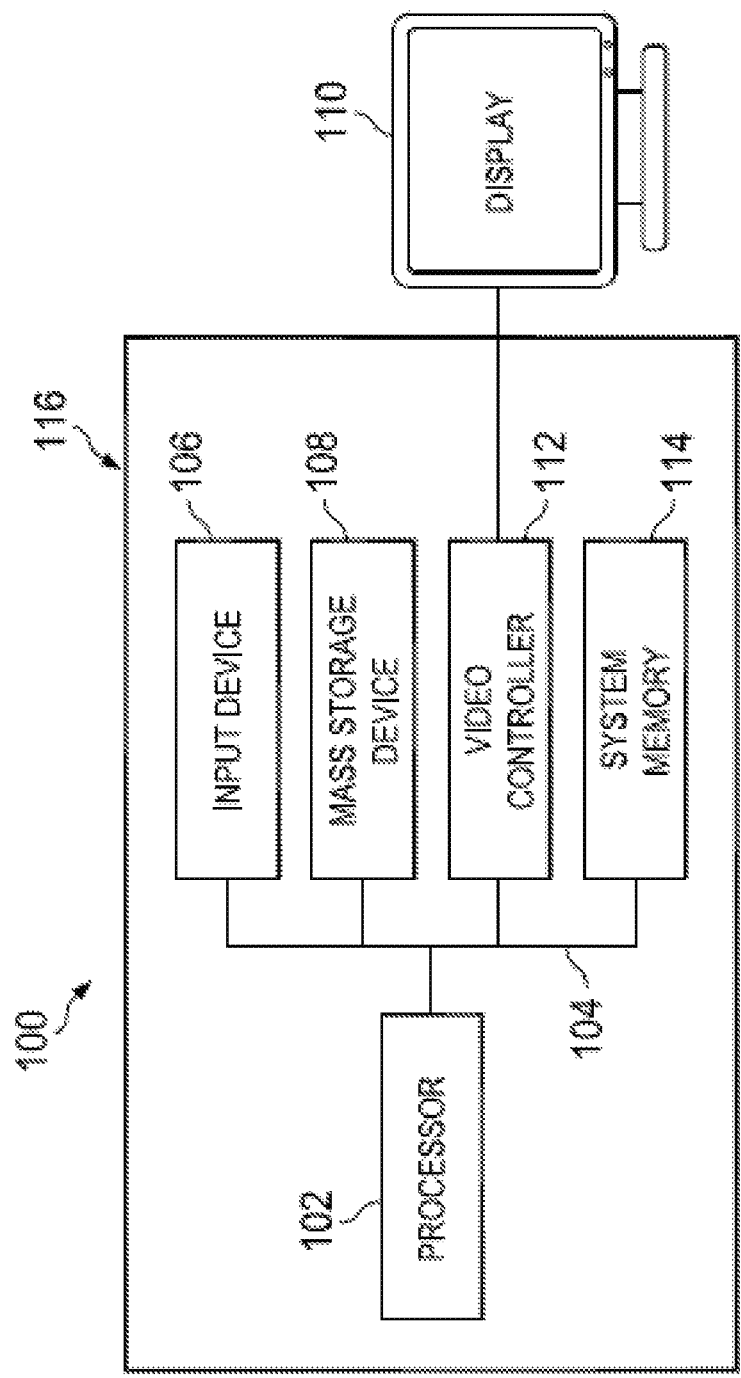
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
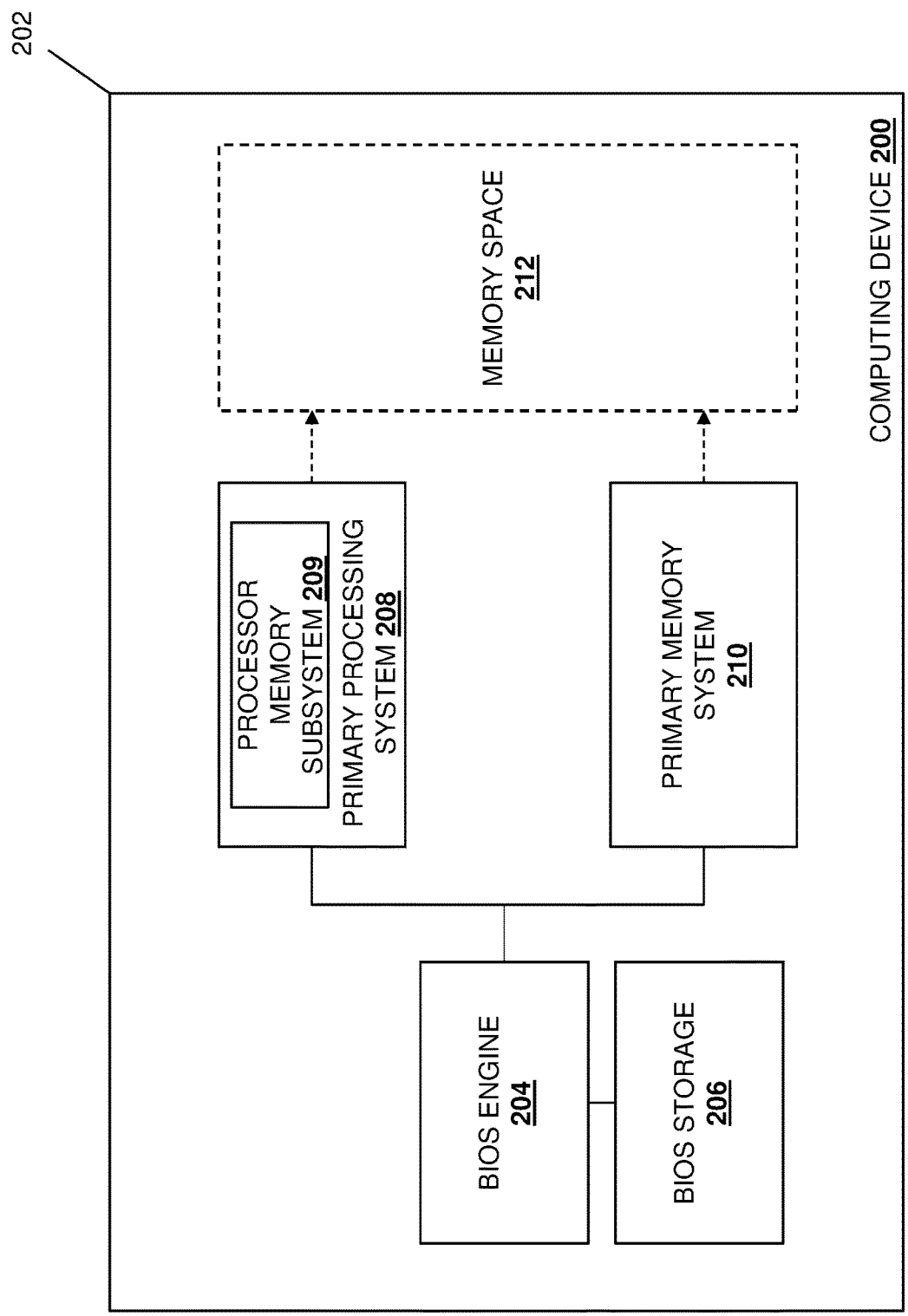
FIG. 2 is a schematic view illustrating an embodiment of a processor memory mapped BIOS boot system.

Referring now to FIG. 2, an embodiment of a computing device 200 is illustrated that includes the processor memory mapped boot system of the present disclosure. In an embodiment, the computing device 200 may be provided by the IHS 100 discussed above, with reference to FIG. 1, and/or may include some or all of the components of the IHS 100. In specific examples, the computing device 200 may be provided by server devices, desktop computing devices, laptop/notebook computing devices, and/or other computing devices known in the art. In the illustrated embodiment, the computing device 200 includes a chassis 202 that houses the components of the computing device 200, only some of which are illustrated in FIG. 2. For example, the chassis 202 may house a BIOS processing system (not illustrated, but which may include the processor 102 discussed above with reference to FIG. 1) and a BIOS memory system (not illustrated, but which may include the memory 114 discussed above with reference to FIG. 1) that is coupled to the BIOS processing system and that includes instructions that, when executed by the BIOS processing system, cause the BIOS processing system to provide a BIOS engine 204 that is configured to perform the functions of the BIOS engines and computing devices discussed below. One of skill in the art in possession of the present disclosure will recognize that the BIOS engine 204 may be provided by non-volatile firmware in the computing device 200 that is also configured to perform conventional BIOS functions such as hardware initialization during a booting process for the computing device 200, runtime services for operating system and applications executed by the computing device 200 in a runtime environment, and/or any other BIOS functionality know in the art. Furthermore, while the term "BIOS" is used, one of skill in the art in possession of the present disclosure will recognize that the BIOS engine 204 may operate according to the Universally Extensible Firmware Interface (UEFI) specification while remaining within the scope of the present disclosure as well.

The chassis 202 may also house a BIOS storage 206 that is coupled to the BIOS engine 204. While the BIOS storage 206 is illustrated as coupled to the BIOS engine 204 (e.g., via a coupling between the BIOS storage 206 and the BIOS processing system that provides the BIOS engine 204), the BIOS storage 206 may be part of a BIOS that includes the BIOS engine 204 while remaining within the scope of the present disclosure. In a specific example, the BIOS storage 206 may be provided by a Serial Peripheral Interface (SPI) flash device, although other storage devices may fall within the scope of the present disclosure as well. As discussed below, in some embodiments the BIOS storage 206 may store a processor memory subsystem boot memory setting that is configured to enable a processor memory subsystem boot memory mode, as well as a variety of other BIOS storage elements that would be apparent to one of skill in the art in possession of the present disclosure.

The chassis 202 may also house a primary processing system 208 that may be provided by a Central Processing Unit (CPU) and/or other primary processing systems known in the art. As illustrated, the primary processing system 208 may include a processor memory subsystem 209. In a specific example, the primary processing system 208 may be provided by second generation Xeon Phi processor(s) provided by INTEL® Corporation of Santa Clara, Calif., United States, and the processor memory subsystem 209 may be provided by an on-package, relatively high-bandwidth, Multi-Channel Dynamic Random Access Memory (MC-DRAM). However, one of skill in the art in possession of the present disclosure will recognize that other primary processing systems utilizing other high bandwidth processor memory subsystems will fall within the scope of the present disclosure as well.

The chassis 202 may also house a primary memory system 210 that may be provided by one or more memory devices known in the art. In a specific example, the primary memory system 210 may be provided by a plurality of Dual Data Rate (DDR) Dynamic Random Access Memory (DRAM) such as the DDR4 DRAM discussed in some of the examples below. However, one of skill in the art in possession of the present disclosure will recognize that other primary memory systems utilizing other memory devices will fall within the scope of the present disclosure as well. The embodiment of FIG. 2 illustrates how the primary memory system 210 and processor memory subsystem 209 in the primary processing system 208 may be mapped to a memory space 212 for the computing device 200. As would be understood by one off skill in the art in possession of the present disclosure, following the beginning of a boot process, the BIOS engine 204 may be configured to execute from the BIOS storage 206 until the primary processing system 208 and the primary memory system 210 have been initialized such that Memory Reference Code (MRC) in the BIOS engine 204 can create the memory space 212 via mapping of the primary memory system 210 and the processor memory subsystem 209 in the primary processing system 208, discussed in further detail with reference to FIG. 3. Once the memory space 212 is created (e.g., the execution of the MRC is completed), the contents of the BIOS storage 206 may be copied to a default memory space region in the memory space 212 so that the BIOS engine 204 may complete boot operations by executing from the memory space 212. While a specific computing device 200 has been illustrated and described, one of skill in the art in possession of the present disclosure will recognize that computing devices may include other components and/or component configurations in order to provide conventional functionality, and/or the functionality discussed below, while remaining within the scope of the present disclosure.

Figure 3:
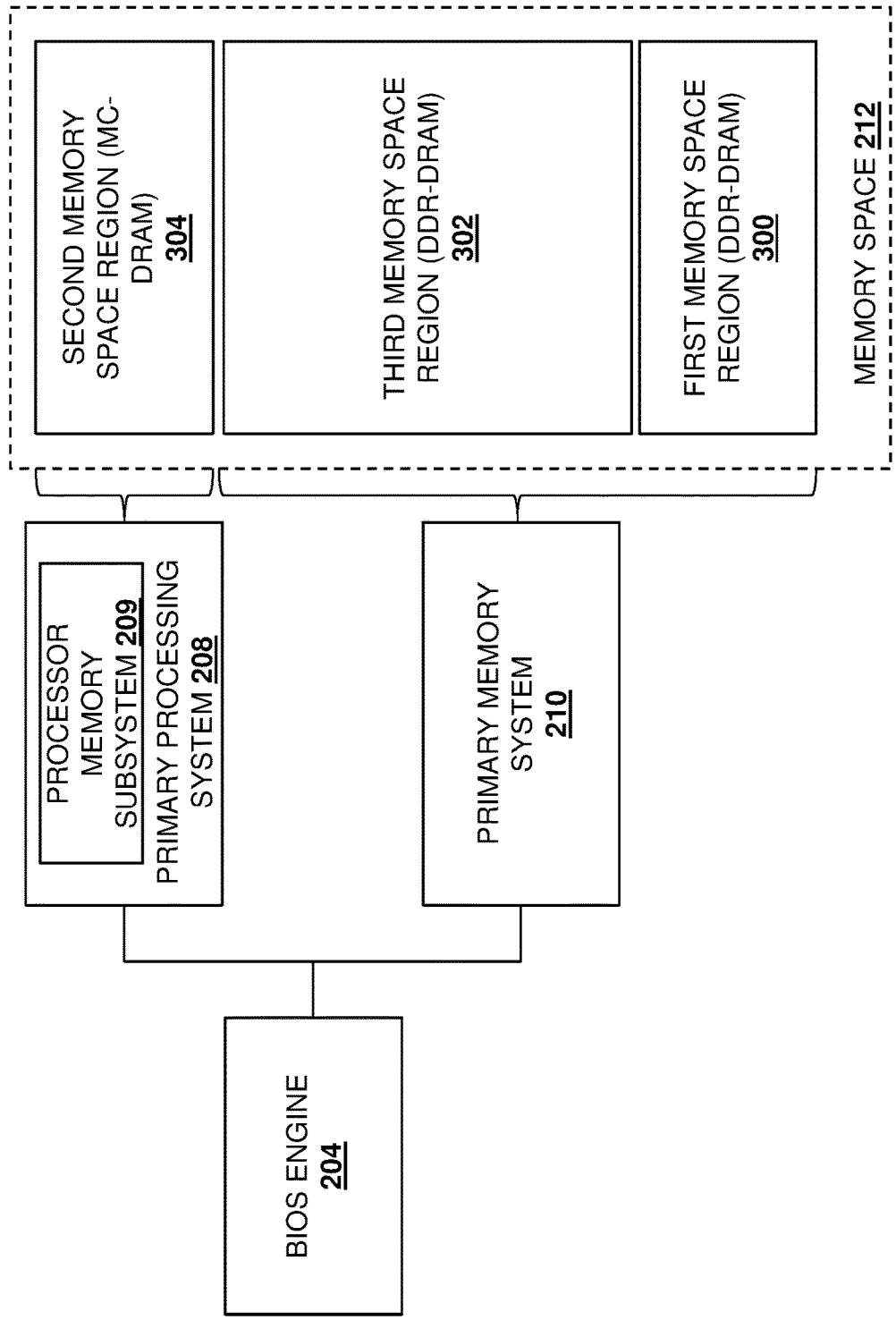
FIG. 3 is a schematic view illustrating an embodiment of a memory space configured according to conventional boot operations.

Referring to FIG. 3, an embodiment of the memory space 212 configured according to conventional boot operations is illustrated. As discussed above, during a conventional boot process and following the initialization of the primary processing system 208 and the primary memory system 210, Memory Reference Code (MRC) in the BIOS engine 204 may create the memory space 212 via mapping of the primary memory system 210 and the processor memory subsystem 209 in the primary processing system 208. Conventional boot operations provide for the mapping of the memory device(s) (e.g., DDR-DRAM) in the primary memory system 210 to a first memory space region 300 in the memory space 212 (also referred to as a "low memory address space" that typically exists in the 0 GB to 4 GB range of the memory space 212), and to a third memory space region 302 in the memory space 212 (also referred to as a "high memory address space" that typically exists above the 0 GB to 4 GB region of the memory space 212 and up to 16 GB/32 GB/64 GB/etc. that is provided by the remainder of the DDR-DRAM that is available in the primary memory system 210 and that is not mapped to the 0 GB to 4 GB range of the memory space 212) that is substantially contiguous with the first memory space region 300

Conventional boot operations also provide for the mapping of the processor memory subsystem 209 (e.g., MC-DRAM) in the primary processing system 208 to a second memory space region 304 that is substantially contiguous with the third memory space region 302 (i.e., at the "top" of the "high memory address space".) As would be appreciated by one of skill in the art in possession of the present disclosure, such conventional memory mapping techniques make the memory subsystem 209 in the primary processing system 208 unavailable for use by the BIOS engine 204, as the first memory space region 300/low memory address space provide the default BIOS boot memory region (e.g., typically at the "top" of the "low memory address space" adjacent the 4 GB boundary of the memory space 212 between the "low memory address space" and the "high memory address space") to which the code from the BIOS storage is copied so that the BIOS engine 204 may complete boot operations by executing from the memory space 212.

Figure 4:
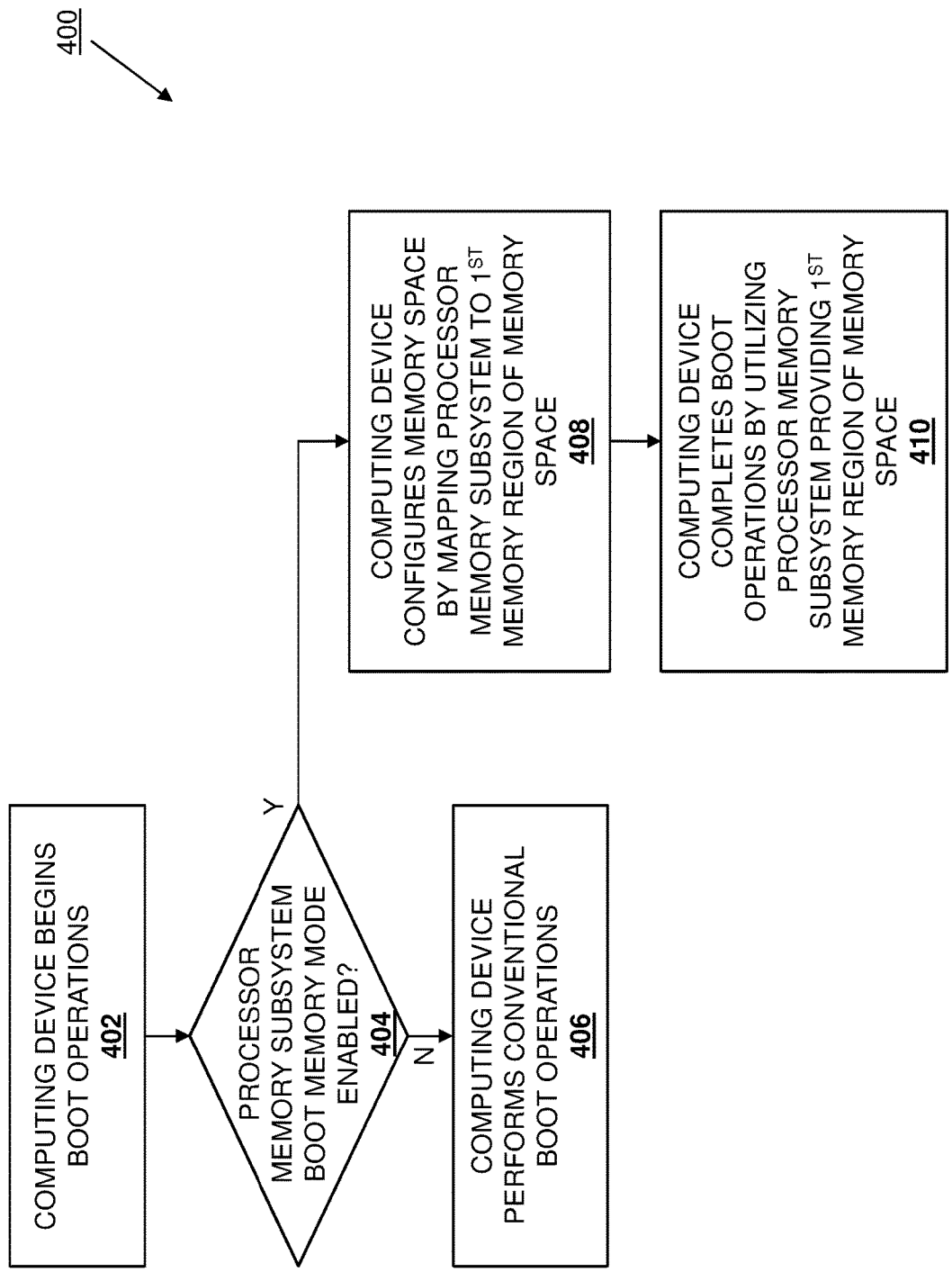
FIG. 4 is a flow chart illustrating an embodiment of a method for mapping processor memory for use in boot operations.

Referring now to FIG. 4, an embodiment of a method 400 method for mapping processor memory for use in boot operations is illustrated. As discussed below, embodiments of the systems and methods of the present disclosure provide for the mapping of a portion of a processor memory subsystem in a processing system (e.g., high bandwidth MC-DRAM in a x86 processor) to the low memory address space (e.g., below the 4 GB boundary in the memory space) that is utilized by the BIOS as a default location for booting operations. In some examples, a first portion of the processor memory subsystem may be mapped to the low memory address space for booting operations, while a remaining portion of the processor memory subsystem may be mapped to the top of the high memory address space (e.g., for use in conventional MC-DRAM operations) and/or allocated for use as a cache for the memory system. Subsequent to the mapping (e.g., once the execution of the MRC is completed), the contents of a BIOS storage may be copied to the (portion of the) processor memory subsystem that is providing the low memory address space/default location for booting operations, and the BIOS is executed from those contents to complete boot operations using the relatively high bandwidth processor memory subsystem. It has been found that execution of the BIOS in such a manner can substantially decrease boot times relative to conventional boot systems.

The method 400 may begin at block 402 where a computing device begins boot operations. In an embodiment, at block 402, the computing device 200 may be powered-on, reset, rebooted, or otherwise initialized and, in response, the computing device 200 will begin boot operations. As would be understood by one of skill in the art in possession of the present disclosure, a boot process may include initialization of the primary processing system, initialization of the primary memory system, initialization of other subsystems in the computing device 200, performance of a Power-On Self-Test (POST), loading of an operating system, and/or any other boot operations known in the art. In particular, boot operations may include the memory mapping discussed below. As such, the beginning of boot operations at block 402 may include boot operations performed prior to that memory mapping, although one of skill in the art in possession of the present disclosure will recognize that other boot operations may be performed at block 402 while remaining within the scope of the present disclosure.

The method 400 may then proceed to decision block 404 where it is determined whether a processor memory subsystem boot memory mode is enabled. In an embodiment, at decision block 404, the BIOS engine 204 may access the BIOS storage 206 to determine whether a processor memory subsystem boot memory setting has been provided in the BIOS storage 206 to enable the processor memory subsystem boot memory mode. While enablement of the processor memory subsystem boot memory mode via a processor memory subsystem boot memory setting in the BIOS storage 206 is described herein, one of skill in the art in possession of the present disclosure will recognize that the processor memory subsystem boot memory mode may be enabled in a variety of other manners while remaining within the scope of the present disclosure.

If, at decision block 404, it is determined that the processor memory subsystem boot memory mode is not enabled, the method 400 may proceed to block 406 where the computing device performs conventional boot operations. In an embodiment, at block 406 and in response to the BIOS engine 204 determining that the processor memory subsystem boot memory mode is not enabled, the BIOS engine 204 may perform conventional boot operations that may include the conventional memory mapping operations discussed above with reference to FIG. 3, the completion of boot operations (e.g., the loading of an operating system) via the (portion of the) primary memory subsystem 210 mapped to the first memory space region 300/low memory address space, and/or any other conventional boot operations known in the art.

If, at decision block 404, it is determined that the processor memory subsystem boot memory mode is enabled, the method 400 may proceed to block 408 where the computing device configures a memory space by mapping the processor memory subsystem to a first memory region of the memory space. In an embodiment, at block 408 and in response to the BIOS engine 204 determining that the processor memory subsystem boot memory mode is enabled, the BIOS engine 204 may operate to configure the memory space 212 by mapping a portion of the processor memory subsystem 209 to a first memory space region 500 of the memory space 212 that will be used by the BIOS engine to complete boot operations. As discussed below, in many embodiments the processor memory subsystem 209 may include more memory than is necessary to complete the boot operations and, as such, a portion of the processor memory subsystem 209 may be mapped to the first memory space region 500 of the memory space 212 that will be used by the BIOS engine to complete boot operations, while the remaining portion of the processor memory subsystem 209 may be configured for use in conventional processor memory subsystem operations.

For example, the processor memory subsystem 209 may be provided by MC-DRAM that is conventionally configurable (e.g., via a setting in the BIOS storage 206) to operate in a cache mode where the MC-DRAM is used by the primary processing system 208 as a side cache for the primary memory system 210 (e.g., provided by DDR4 DRAM), a flat mode in which the MC-DRAM is mapped to the top of the high memory address space in the memory space 212, and a hybrid mode where the MC-DRAM includes a first portion that is mapped to the top of the high memory address space in the memory space 212 and a second portion that is used by the primary processing system 208 as a side cache for the primary memory system 210. As discussed below, the systems and methods of the present disclosure may extend the mapping/configuration modes of an MC-DRAM to provide for the mapping of at least a portion of the MC-DRAM to the low memory address space in the memory space 212 at block 408.

Figure 5:
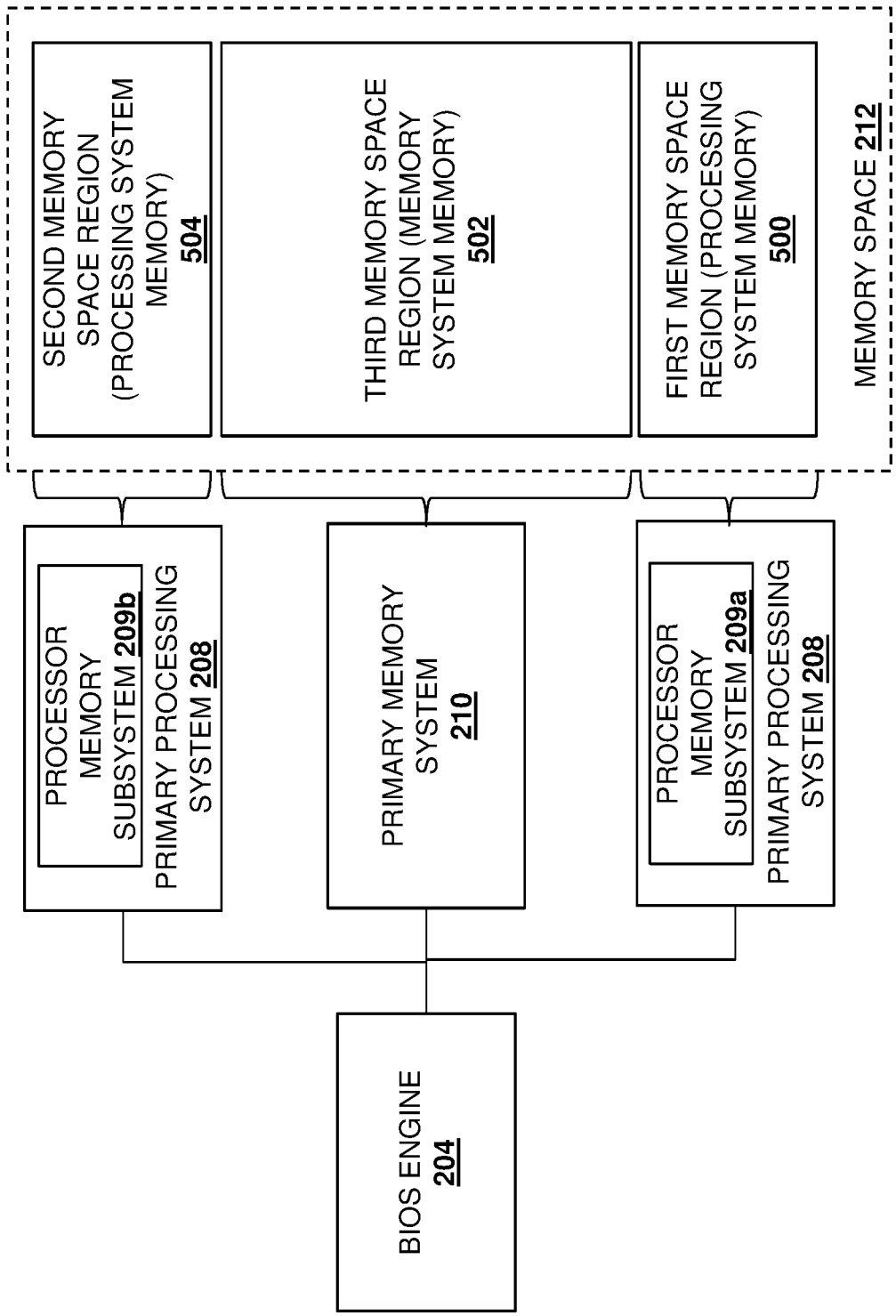
FIG. 5 is a schematic view illustrating an embodiment of the processor memory mapped boot system of FIG. 2 having mapped processor memory for use in boot operations.

For example, with reference to FIG. 5, at block 408, following the initialization of the primary processing system 208 and the primary memory system 210, Memory Reference Code (MRC) in the BIOS engine 204 may create the memory space 212 via mapping of the primary memory system 210 and the processor memory subsystem 209 in the primary processing system 208. In particular, the BIOS engine 204 may map a first portion of the processor memory subsystem 209a (e.g., MC-DRAM) to a first memory space region 500 in the memory space 212 (also referred to as a "low memory address space" that typically exists in the 0 GB to 4 GB range of the memory space 212). The BIOS engine 204 may also map the memory device(s) (e.g., DDR-DRAM) to a third memory space region 502 in the memory space 212 (also referred to as a "high memory address space" that typically exists above the 0 GB to 4 GB region of the memory space 212 and up to 16 GB/32 GB/64 GB/etc. that is provided by the DDR-DRAM available in the primary memory system 210) that is substantially contiguous with the first memory space region 500. The BIOS engine 204 may also map a second portion of the processor memory subsystem 209b in the primary processing system 208 (e.g., MC-DRAM) to a second memory space region 504 that is substantially contiguous with the third memory space region 502 (i.e., at the "top" of the "high memory address space".) As would be appreciated by one of skill in the art in possession of the present disclosure, the memory mapping techniques of the present disclosure make the first portion of the processor memory subsystem 209a in the primary processing system 208 available for use by the BIOS engine 204 when the first memory space region 500/low memory address space provides the default BIOS boot memory to which the code from the BIOS storage 206 is copied so that the BIOS engine 204 may complete boot operations by executing from the memory space 212.

The mapping, allocation, and/or configuration of the processor memory subsystem 209 in the primary processing system 208 at block 408 may be performed in a variety of manners. In some embodiments, the first portion of the processor memory subsystem 209a in the primary processing system 208 that is mapped to the first memory space region 500 may provide the entirety of the 0-4 GB memory address space of the memory space 212 that is utilized by the BIOS as the default BIOS boot memory for completing boot operations. However, as discussed above, the default BIOS boot memory is typically provided at the "top" of the "low memory address space" adjacent the 4 GB boundary of the memory space 212, as the BIOS typically does not require the full 4 GB of memory space that is available in the low memory address space to complete boot operations. As such, in some embodiments the first portion of the processor memory subsystem 209a in the primary processing system 208 that is mapped to the first memory space region 500 may provide a portion of the 0-4 GB memory address space of the memory space 212 (e.g., the "top" of the "low memory address space") that is utilized by the BIOS as the default BIOS boot memory for completing boot operations, and the remaining portion of the 0-4 GB memory address space of the memory space 212 may be provided by a portion of the primary memory system 210 (e.g., DDR4 DRAM) via the mapping operations discussed above.

In an embodiment, additional hybrid mode(s) may be provided for MC-DRAM in order to provide for the mapping illustrated in FIG. 5. For example, a first (conventional) hybrid mode may provide for the conventional mapping of the first portion of the processor memory subsystem to the top of the high memory address space in the memory space 212, and the allocation of the second portion of the processor memory subsystem for use by the primary processing system 208 as a side cache for the primary memory system 210, as discussed above. In addition, a second hybrid mode may provide for the mapping of the first portion of the processor memory subsystem 209a to the low memory address space in the memory space 212, and the mapping of the second portion of the processor memory subsystem 209b to the top of the high memory address space in the memory space 212, as illustrated in FIG. 5. Furthermore, a third hybrid mode may provide for the mapping of the first portion of the processor memory subsystem 209a to the low memory address space in the memory space 212, and the allocation of a second portion of the processor memory subsystem 209 (e.g., similar to the second portion of the processor memory subsystem 209a) for use by the primary processing system 208 as a cache for the primary memory system 210. Further still, a fourth hybrid mode may provide for the mapping of the first portion of the processor memory subsystem 209a to the low memory address space in the memory space 212, the mapping of the second portion of the processor memory subsystem 209b to the top of the high memory address space in the memory space 212, and the allocation of a third portion of the processor memory subsystem 208 (e.g., the remaining portion of the processor memory subsystem 208 not mapped to the low memory address space and the top of the high memory address space) for use by the primary processing system 210 as a cache for the primary memory system 210. While a few examples of hybrid modes that provide for the mapping of a first portion of a processor memory subsystem to low memory address space in the memory space 212, along with the mapping and/or cache allocations of other portion(s) of the processor memory subsystem, one of skill in the art in possession of the present disclosure will recognize that other hybrid modes and/or mapping/configuration modes that provide for the mapping of a processor memory subsystem to low memory address space in the memory space 212 will fall within the scope of the present disclosure as well.

The method 400 may then proceed to block 410 where the computing device completes boot operations by utilizing the processor memory subsystem providing the first memory region of the memory space. In an embodiment, at block 410, the BIOS engine 204 utilizes the processor memory subsystem 209 that is providing the first memory space region 500 of the memory space 212 in order to complete boot operations. For example, at block 410, the execution of the MRC may be completed and some or all of the contents of the BIOS storage 206 may be copied to the first portion of the processor memory subsystem 209a that was mapped to the first memory space region 500/low memory address space, and the BIOS engine 204 may perform a Power-On Self-Test (POST), load an operating system, and/or complete other boot operations known in the art that would provide for the completion of a boot process such that the computing device 200 may enter a runtime environment. In experimental embodiments, it has been found that the completion of boot operations utilizing processor memory subsystems such as MC-DRAM provides a boot process that is approximately five times faster than a boot process conducted utilizing primary memory systems such as DDR-DRAM. Subsequent to the completion of boot operations, the second portion of the processor memory subsystem 209*b* (i.e., that was mapped to the second memory space region 504/top of the high memory address space) may be utilized by applications while in the runtime environment, and/or a second portion or third portion of the processor memory subsystem 209 may be utilized by the primary processing system 208 as a cache for the primary memory system 210.

Thus, systems and methods have been described that provide for the mapping of a portion of a processor memory subsystem in a processing system (e.g., high bandwidth MC-DRAM in a x86 processor) to the low memory address space (e.g., below the 4 GB boundary in the memory space) that is utilized by the BIOS as a default location for booting operations. For example, a first portion of the processor memory subsystem may be mapped to the low memory address space that is the default memory space utilized for booting operations, while remaining portions of the processor memory subsystem may be mapped to the top of the high memory address space (e.g., for use in conventional MC-DRAM operations) and/or allocated for use by the processing system as a cache for the memory system. Subsequent to the mapping, the contents of a BIOS storage may be copied to the processor memory subsystem providing the low memory address space/default location for booting operations, and the BIOS is executed using the relatively high bandwidth processor memory subsystem to substantially decrease boot times relative to conventional boot systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A processor memory mapped boot system, comprising:
a processing system including a processor memory subsystem;
a memory system that includes at least one memory device; and
a Basic Input/Output System (BIOS) engine that is coupled to the processing system and the memory system, wherein the BIOS engine is configured to:
begin boot operations;
detect a boot memory mode setting for the processor memory subsystem;
configure, using Memory Reference Code (MRC), a memory space that includes the at least one memory device and the processor memory subsystem, wherein the configuring the memory space includes;
mapping, in response to detecting the boot memory mode setting, a first portion of the processor memory subsystem to a first memory region of the memory space that is utilized by the BIOS engine as a default BIOS boot memory region for completing the boot operations; and
mapping, in response to detecting the boot memory mode setting, a second portion of the processor memory subsystem to a second memory region of the memory space that is not utilized by the BIOS engine to complete the boot operations;
copy, subsequent to the mapping of the first portion of the processor memory subsystem to the first memory region of the memory space, boot code from a BIOS storage to the processor memory subsystem that is mapped to the first memory region of the memory space; and
complete the boot operations utilizing the first portion of the processor memory subsystem mapped to the first memory region of the memory space by executing the boot code from first portion of the processor memory subsystem via the first memory region of the memory space.

2. The system of claim 1, wherein the configuring the memory space includes mapping the at least one memory device to provide a third memory region of the memory space, wherein the third memory region is not used to complete the boot operations.

3. The system of claim 1, wherein the BIOS engine is configured to:
allocate a third portion of the processor memory subsystem as a cache for the memory system.

4. The system of claim 1, wherein the processor memory subsystem includes a Multi-Channel Dynamic Random Access Memory (MC-DRAM).

5. The system of claim 1, wherein the mapping, in response to detecting the boot memory mode setting, the first portion of the processor memory subsystem to the first memory region of the memory space that is utilized by the BIOS engine as the default BIOS boot memory region for completing the boot operations includes the BIOS engine mapping the first portion of the processor memory subsystem to a first portion of the first memory region of the memory space that is utilized by the BIOS engine more frequently than a second portion of the first memory region of the memory space.

6. An information handling system (IHS), comprising:
a Basic Input/Output System (BIOS) processing system; and
a BIOS memory system that is coupled to the BIOS processing system and that includes instructions that, when executed by the BIOS processing system, cause the BIOS processing system to provide a BIOS engine that is configured to:
begin boot operations;
detect a boot memory mode setting for a processor memory subsystem that is part of a primary processing system;
configure, using Memory Reference Code (MRC), a memory space that includes the processor memory subsystem and at least one memory device that is included in a primary memory system, wherein the configuring the memory space includes:
mapping, in response to detecting the boot memory mode setting, a first portion of the processor memory subsystem to a first memory region of the memory space that is utilized by the BIOS engine as a default BIOS boot memory region for completing the boot operations; and
mapping, in response to detecting the boot memory mode setting, a second portion of the processor memory subsystem to a second memory region of the memory space that is not utilized by the BIOS engine to complete the boot operations;

copy, subsequent to the mapping of the first portion of the processor memory subsystem to provide the first memory region of the memory space, boot code from a BIOS storage to the first portion of the processor memory subsystem that is mapped to the first memory region of the memory space; and complete the boot operations utilizing the first portion of the processor memory subsystem mapped to the first memory region of the memory space by executing the boot code from the first portion of the processor memory subsystem via the first memory region of the memory space.

7. The IHS of claim 6, wherein the configuring the memory space includes mapping the at least one memory device to provide a third memory region of the memory space, wherein the third memory region is not used to complete the boot operations.

8. The IHS of claim 6, wherein the BIOS engine is configured to:
allocate a third portion of the processor memory subsystem as a cache for the primary memory system.

9. The IHS of claim 6, wherein the processor memory subsystem includes a Multi-Channel Dynamic Random Access Memory (MC-DRAM).

10. The IHS of claim 6, wherein the mapping, in response to detecting the boot memory mode setting, the first portion of the processor memory subsystem to the first memory region of the memory space that is utilized by the BIOS engine as the default BIOS boot memory region for completing the boot operations includes the BIOS engine mapping the first portion of the processor memory subsystem to a first portion of the first memory region of the memory space that is utilized by the BIOS engine more frequently than a second portion of the first memory region of the memory space.

11. A method for mapping processor memory for use in boot operations, comprising:
beginning, by a computing device, boot operations;
detecting, by the computing device, a boot memory mode setting for a processor memory subsystem that is part of a processing system in the computing device;
configuring, by the computing device using Memory Reference Code (MRC), a memory space that includes the processor memory subsystem and at least one memory device that is included in a memory system in the computing device, wherein the configuring the memory space includes:
mapping, in response to detecting the boot memory mode setting, a portion of the processor memory subsystem to a first memory region of the memory space that is utilized by the BIOS engine as a default BIOS boot memory region for completing the boot operations; and
mapping, in response to detecting the boot memory mode setting, a second portion of the processor memory subsystem to a second memory region of the memory space that is not utilized by the BIOS engine to complete the boot operations;
copying, by the computing device and subsequent to the mapping of the first portion of the processor memory subsystem to provide the first memory region of the memory space, boot code from a BIOS storage to the first portion of the processor memory subsystem that is mapped to the first memory region of the memory space; and
completing, by the computing device, boot operations utilizing the first portion of the processor memory subsystem that is mapped to the first memory region of the memory space by executing the boot code from the first portion of the processor memory subsystem via the first memory region of the memory space.

12. The method of claim 11, wherein the configuring the memory space includes mapping the at least one memory device to provide a third memory region of the memory space, wherein the third memory region is not used to complete the boot operations.

13. The method of claim 11, wherein the method further comprises:
allocating, by the computing device, a third portion of the processor memory subsystem as a cache for the memory system.

14. The method of claim 11, wherein the processor memory subsystem includes a Multi-Channel Dynamic Random Access Memory (MC-DRAM).

15. The method of claim 11, wherein the mapping, in response to detecting the boot memory mode setting, the first portion of the processor memory subsystem to the first memory region of the memory space that is utilized by the BIOS engine as the default BIOS boot memory region for completing the boot operations includes the BIOS engine mapping the first portion of the processor memory subsystem to a first portion of the first memory region of the memory space that is utilized by the BIOS engine more frequently than a second portion of the first memory region of the memory space.

\* \* \* \* \*